United States Patent [19]

Jensen

[11] Patent Number: 5,006,204
[45] Date of Patent: Apr. 9, 1991

[54] APPARATUS FOR CRYSTALLIZING WHEY

[75] Inventor: Jens P. Jensen, Hudson, Wis.

[73] Assignee: A/S Niro Atomizer, Soeborg, Denmark

[21] Appl. No.: 264,569

[22] Filed: Oct. 31, 1988

Related U.S. Application Data

[63] Continuation-in-part of Ser. No. 230,545, Aug. 10, 1988, abandoned.

[51] Int. Cl.$^5$ .............................................. B01D 1/18
[52] U.S. Cl. ...................................... 159/3; 23/313 P; 34/58; 34/60; 159/45; 159/48.1; 159/DIG. 3; 202/236; 203/48; 203/90
[58] Field of Search ............... 159/3, 45, 48.1, DIG. 3, 159/DIG. 38; 203/48, 90; 202/236; 422/254; 34/58, 59, 60; 23/313 P, 313 PB

[56] References Cited

U.S. PATENT DOCUMENTS

| | | | |
|---|---|---|---|
| 2,172,393 | 9/1939 | Lavett | 159/17.3 |
| 2,336,461 | 12/1943 | Beardslee | 159/11.1 |
| 3,345,683 | 10/1967 | Eirich et al. | 23/313 P |
| 3,711,254 | 1/1973 | McGowan et al. | 23/313 P |
| 3,819,332 | 6/1974 | Jaccard et al. | 159/11.1 |
| 4,109,019 | 8/1978 | Moore | 426/641 |
| 4,189,343 | 2/1980 | Duerton | 159/11.1 |
| 4,264,543 | 4/1981 | Valenta | 23/313 P |
| 4,490,403 | 12/1984 | Pisecky et al. | 159/DIG. 3 |
| 4,561,192 | 12/1985 | Meade | 159/DIG. 3 |
| 4,629,771 | 12/1986 | Candlin et al. | 526/125 |
| 4,643,852 | 2/1987 | Koslow | 261/93 |
| 4,657,767 | 4/1987 | Meade | 426/467 |
| 4,756,838 | 7/1988 | Veltman | 23/313 R |

Primary Examiner—Virginia Manoharan
Attorney, Agent, or Firm—Armstrong, Nikaido, Marmelstein, Kubovcik & Murray

[57] ABSTRACT

An apparatus including an evaporator, a pre-crystallizer, a spray dryer and a fluid bed for drying whey and a rotating disc having a cone-shaped upper surface is provided for receiving partially dried whey from the spray dryer and delivering the whey to the fluid bed while permitting crystallization of the whey as it rests on the surface of the disc.

8 Claims, 4 Drawing Sheets

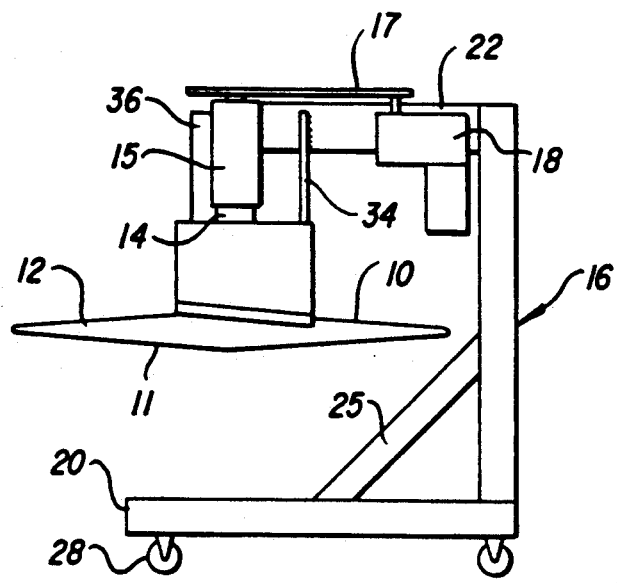
FIG. 3
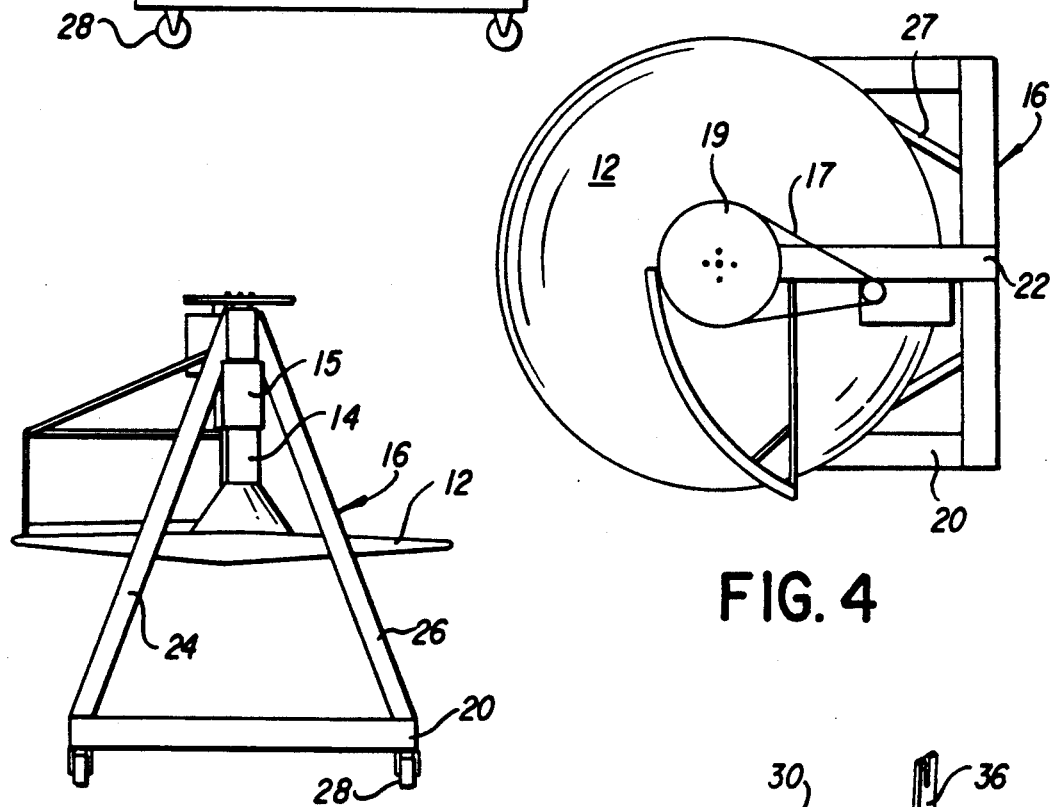
FIG. 4
FIG. 5
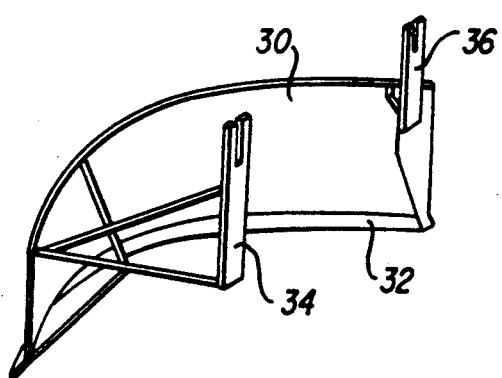
FIG. 6

APPARATUS FOR CRYSTALLIZING WHEY

The present invention relates to improved apparatus for crystallizing whey and is a continuation-in-part of application Ser. No. 230,545, filed Aug. 10, 1988, now abandoned.

BACKGROUND OF THE INVENTION

Whey is the watery residue remaining after fat and casein have been removed from whole milk in the manufacture of cheese, or after casein has been removed from skim milk in the manufacture of casein or cottage cheese. The composition of whey varies, but a typical whey has a solids content of about 6%, about 60-70% of which is lactose or milk sugar. Also present is protein, mainly albumin, and small amounts of fat and various mineral salts or ash.

The lactose in raw whey is an equilibrium mixture of the alpha and the beta forms of the lactose. The alpha form crystallizes from solution as the monohydrate at temperatures below 93° C. and is the ordinary milk sugar of commerce. The beta form, present in the equilibrium mixture in the greater amount, is an anhydride which crystallizes above 93° C. When whey is rapidly dried to a low moisture content, the dry product contains alpha and beta lactose in essentially the same proportions as in the whey before it has been dried. The rapidly dried product is a non-crystalline, paste-like material, which is difficult to process.

Although the following disclosure is made with particular reference to the drying of whey, it will also be understood that the apparatus is useful in drying whey permeate which is a residue from ultrafiltration of protein from whey.

DESCRIPTION OF THE PRIOR ART

Prior art procedures for drying and crystallizing whey are described in U.S. Pat. Nos. 2,172,393; 2,188,907; 2,197,804, and 2,336,461. In a typical procedure, the raw whey is first concentrated by the removal of water in a series of multiple effect vacuum evaporators. The concentrated liquid whey from the evaporators, while still warm, is incompletely dried on a pair of steam-heated, outwardly rotating drums. The pasty material formed is stripped from the drums by means of doctor blades and deposited on an endless belt. The pasty material rests on the belt for some time and the lactose crystallizes to form the alpha hydrate (moisture in the pasty material provides the water required for forming the crystalline hydrate). The crystalline hydrate is non-hygroscopic and is easy to handle.

The endless belt is more than a means for conveying partially dried lactose from the drying drums to the next stage in its processing. The slow moving belt provides time, typically 10 minutes is generally sufficient, for the pasty material from the drying drums to crystallize so that it can be conveniently handled for packaging or further drying.

A more recent procedure, as illustrated in FIGS. 1 and 2, substitutes a spray dryer for the drum dryer previously utilized for drying the concentrated whey from the evaporators. The spray dried whey is then passed to the endless belt, which serves the same function as before. The crystallized material on the belt is then further dried, and also cooled, in a fluid bed to contain about 2% free water and about 3% crystal bound water.

Due to its structure and mode of operation, it is very difficult to keep the conveyor belt clean and sanitary in compliance with current regulatory standards. Also, the material on the belt tends to get into and foul the driving mechanism for the belt. In order to wash the belt and clean its driving mechanism, it typically is necessary to partially disassemble the apparatus and remove the belt, a time consuming procedure.

It is, therefore, an object of the present invention to provide apparatus for the drying of whey which is both sanitary and convenient to clean, and which can be cleaned-in-place.

BRIEF DESCRIPTION OF THE INVENTION

It has been discovered that the substitution of a rotating disc for the endless belt heretofore utilized as the final crystallization stage in the production of dried whey provides an improved crystallization apparatus. That apparatus comprises:

an evaporator, a pre-crystallizer, a spray dryer, a fluid bed, means for moving said whey from said evaporator to said pre-crystallizer, means for moving said whey from said pre-crystallizer to said spray dryer, a disc located between said spray dryer and said fluid bed and having a cone-shaped upper surface, a shaft supporting said disc for rotation in a horizontal plane, and means for rotating said disc whereby said surface of said disc will receive partially dried whey from said spray dryer and deliver said whey to said fluid bed while permitting crystallization of said whey as it rests on said surface of said rotating disc.

BRIEF DESCRIPTION OF THE DRAWINGS

FIG. 3 is a side elevation of a disc and related apparatus used as the crystallizing stage in the apparatus of the present invention.

FIG. 4 is a plan view of the disc and related apparatus of FIG. 3.

FIG. 5 is a rear view of the disc and related apparatus of FIG. 3.

FIG. 6 is a perspective view of a scraper used in the apparatus of FIG. 3.

DETAILED DESCRIPTION OF THE INVENTION

Figure 1:
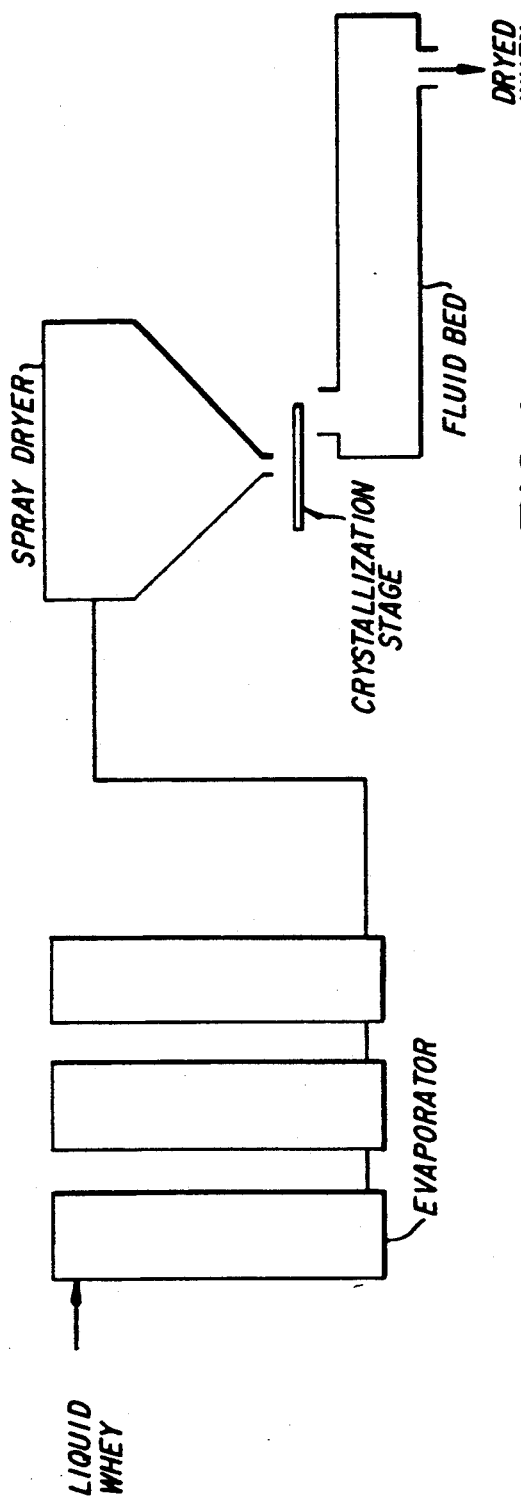
FIG. 1 is a flow sheet illustrating an overall process for the drying of whey.
Figure 2:
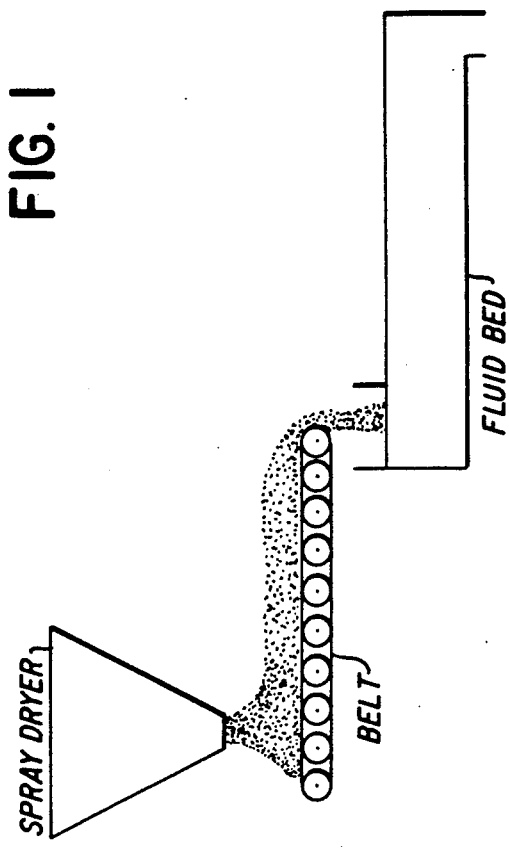
FIG. 2 illustrates a portion of the apparatus of the prior art wherein an endless belt is utilized for the crystallizing stage.

With reference to the drawings wherein like reference numerals refer to the same or like parts throughout, FIGS. 3-6 illustrate one embodiment of a disc 12 and related apparatus used as the crystallizing stage in the present invention. The disc 12 is supported by means of a shaft 14 suspended from a frame 16. The frame 16 is comprised of a base 20 and a box beam 22 supported by frame members 24 and 26 which in turn are supported from the base 20 by angular braces 25 and 27. The base 20 is supported for rolling movement across a supporting surface by means of a plurality of wheels 28.

The shaft 14 is rotatably suspended by means of a bearing assembly 15 from the box beam 22. A motor 18 also supported by the beam 22 drives the shaft 14 by means of a chain 17 engaging a sprocket 19 fixed to the upper end of the shaft. A curved scraper or doctor blade 32 is provided at the lower end of a similarly curved plate 30 which is supported by rods 34 and 36 from the beam 22. The lower edge of the scraper 32 is positioned to ride within about one-quarter inch of the cone-shaped upper surface of the disc 12 to remove the whey deposited thereon as will be more fully described here below. The base 20 of frame 16 is movably mounted on the wheels 28 to permit the disc 12 to be moved relative to a spray dryer and fluid bed. A second cone shaped surface 11 which is inverted relative to the cone shaped upper surface 10 is provided to cover the bottom of the disc and to impart rigidity and to optimize the structural integrity of the disc. The scraper 32 and supporting structure is shown in FIG. 6.

Figure 7:
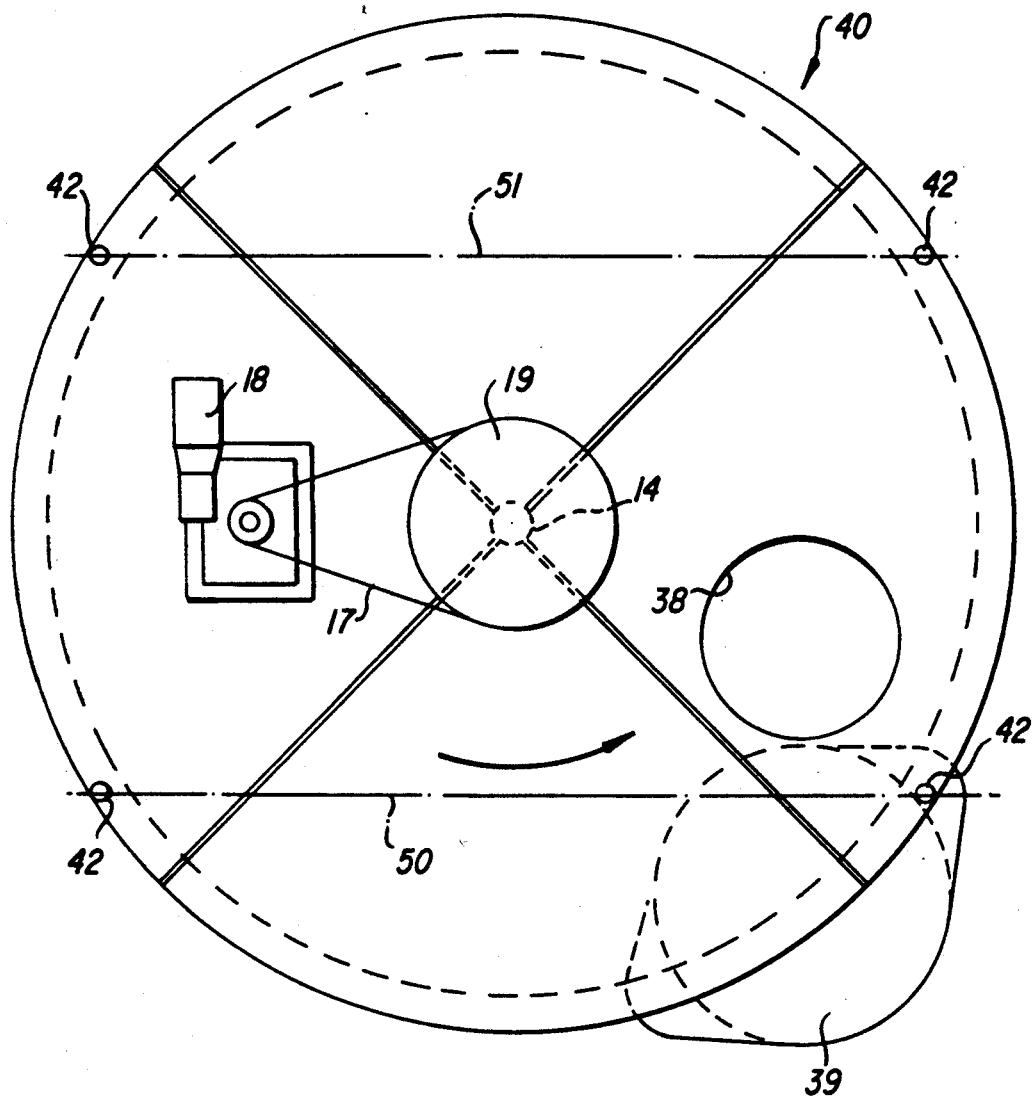
FIG. 7 is a plan view of alternate means for supporting a disc used as the crystallizing stage in the apparatus of the present invention.
Figure 8:
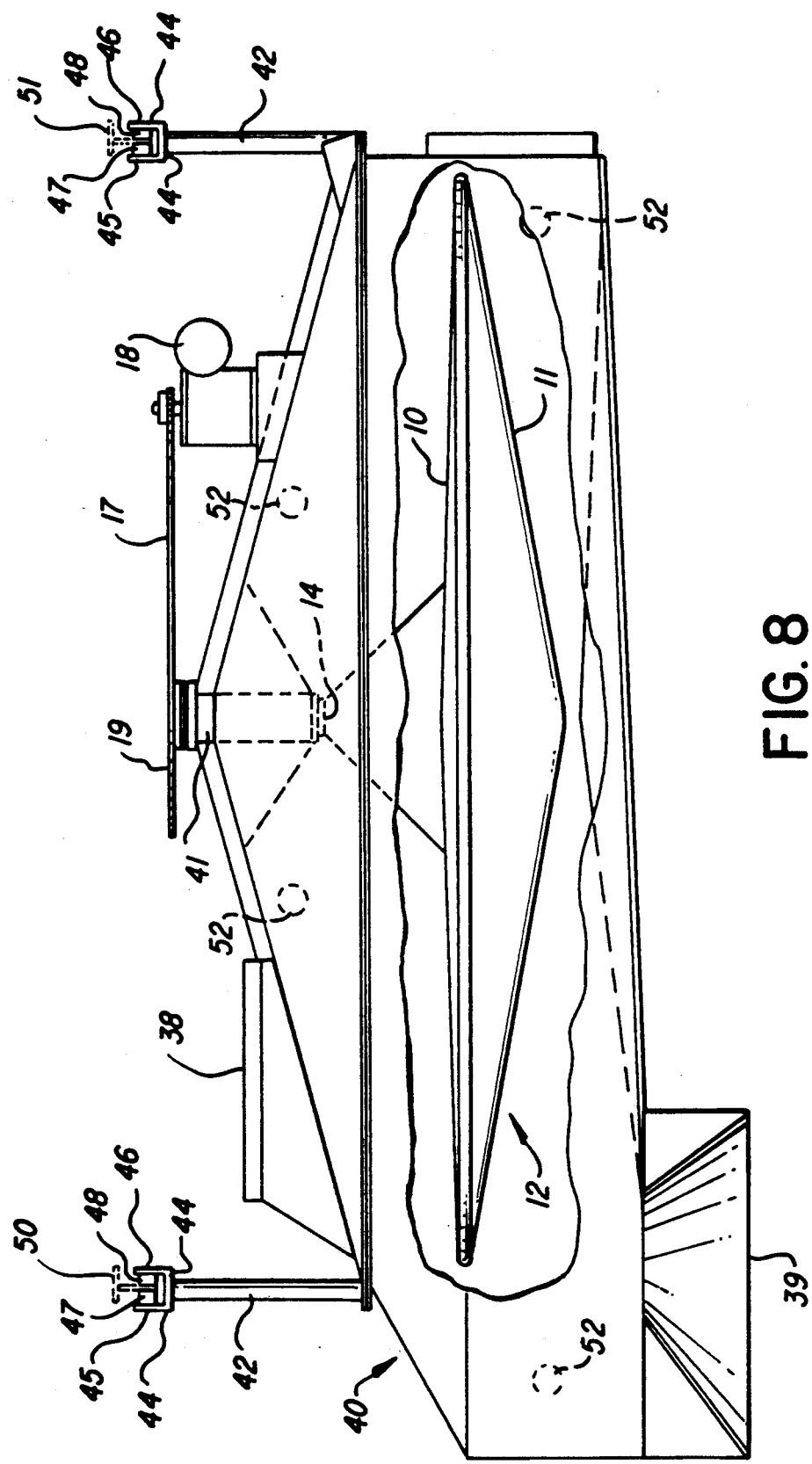
FIG. 8 is a side elevation, partly broken away, of the alternate disc support means shown by FIG. 7.

FIGS. 7 and 8 show an alternate apparatus for supporting a disc used as the crystallization stage in the apparatus of the present invention.

FIGS. 7 and 8 show a generally cylindrical, fabricated housing 40 which movably supports and fully encloses a crystallizing disc permitting cleaning-in-place of the disc. In FIG. 8 a portion of the side of the housing 40 is broken away to show a disc 12 having upper and lower cone shaped surfaces 10 and 11 supported and suspended by a shaft 14 which is rotatably mounted at the apex 41 of the housing 40. Also shown are built-in spray nozzles 52 used to clean-in-place the housing and the enclosed disc.

As in the previous embodiment, the shaft 14 is rotatably driven by a motor 18 and chain 17 engaging a sprocket 19 fixed to the upper end of the shaft 14. The motor 18 is supported by the housing 40.

The housing 40 is also provided with an upstanding circular inlet 38 for receiving whey from a spray drier. The disc 12 typically rotates in an counterclockwise direction as shown by the arrow in FIG. 7 and the crystallized whey is wiped off the disc 12 by a scraper typically positioned proximate the outlet 39.

The housing 40 is suspended by trolleys 44 provided at the upper end of four tubular rods 42. Each tubular rod 42 is suspended from a base plate 44 of a trolley 44. A pair of upstanding side plates 45 and 46 each rotatably mount a roller 47, 48. The rollers 47 and 48 are disposed to ride on the surfaces of a flange of I beam 50 or beam 51. The I beams 50, 51 constitute the major part of a supporting frame for the housing 40 and disc 12. The I beams 50 and 51 which are schematically represented by dot-dash lines in FIG. 7 may be supported at their opposite ends by pedestals or hung from a building framework in conventional manner.

With the embodiment shown by FIGS. 7 and 8, the housing 40 supporting the disc 12 and motor 18 can be moved by the trolleys 44 relative to the I beams 50, 51 which serve as rails to move the disc 12 and supporting housing 40 away from a spray dryer and fluid bed to permit direct connection between said spray drier and said fluid bed, so that the apparatus may be used in operations not requiring the disc.

Preferably, the crystallizing disc 12, as shown in FIGS. 3 and 8 comprises two cones welded together for increased strength. When the disc is cleaned by washing, the pointed shape of the upper cone and the sloped bottom of the housing 40 permits the wash liquid to drain freely off the disc and out of the housing. Since the whey may be slightly acidic and the disc is constantly in contact with moisture, the disc and housing should be fabricated of a corrosion resistant metal, preferably stainless steel.

The disc hangs from a shaft which is supported by a frame. The means for rotating the disc are preferably positioned above the disc to keep them dry and free of whey powder. The disc is conveniently rotated by a chain drive typically powered by a variable speed motor which is adjustable to rotate the disc at different speeds. The disc and shaft are movable relative to the body of the apparatus for convenience in inspecting and maintenance through conveniently located access openings in the housing.

The apparatus contains, in addition to the disc, a doctor blade or scraper for removing crystallized whey powder from the disc. The scraper is mounted using vertically adjustable fastening means so that its position relative to the disc can be readily adjusted. The scraper as shown in FIG. 6 is typically fabricated of a bent piece of sheet metal and has a diameter slightly bigger than the radius of the disc so that the scraper will urge the crystallized whey powder toward the edge of the disc. The lower part of the scraper is shaped like a cone to facilitate the easy removal of the powder from the disc.

Except for the disc and related rotating means, which can rotate the disc at an adjustable rate of rotation, and the scraper, the apparatus of the present invention utilizes equipment conventionally utilized for the drying and crystallization of whey. In operation, the raw whey is concentrated as much as feasible, without adversely affecting the whey or the ability to pump the concentrate, using multiple effect vacuum evaporators. The concentrated whey, from which most of the water has been removed, following pre-crystallization, is then pumped to the spray dryer. The pasty material from the spray dryer, containing about 10%–14% water, is passed to the rotating disc where it forms an irregular semi-round shaped discontinuous ring on the upper cone-shaped surface of the disc. The disc slowly rotates with an adjustable period of rotation of about 4–15 minutes, typically 10 minutes, during which period the lactose in the pasty material crystallizes. The scraper separates the now non-sticky crystallized whey powder from the disc and passes it to the fluid bed for drying to a final free moisture content of about 2%.

What is claimed is:

1. Apparatus for drying whey comprising:
   an evaporator, a pre-crystallizer, a spray dryer, a fluid bed, means for moving said whey from said evaporator to said pre-crystallizer, means for moving said whey from the pre-crystallizer to said spray dryer, a disc located between said spray dryer and said fluid bed and having a cone-shaped upper surface, a shaft supporting said disc for rotation in a horizontal plane, and means for rotating said disc whereby said surface of said disc will receive partially dried whey from said spray dryer and deliver said whey to said fluid bed while permitting crystallization of said whey as it rests on said surface of said disc.

2. The apparatus defined by claim 1, further including a scraper having an edge surface wiping whey from said surface of said disc.

3. The apparatus defined by claim 1, further including a frame supporting said shaft and said disc is suspended from said frame by said shaft.

4. The apparatus defined by claim 3 wherein said frame and said disc are movable relative to said spray dryer and said fluid bed to permit direct connection between said spray dryer and said fluid bed.

5. The apparatus defined by claim 1, wherein said means for rotating said disc is located above said disc.

6. The apparatus defined by claim 1, wherein said means for rotating said disc is adjustable to rotate said disc at different speeds.

7. The apparatus defined by claim 1, wherein said disc includes a second cone-shaped surface which is inverted relative to said cone-shaped upper surface and covers the bottom of said disc.

8. The apparatus defined by claim 1, wherein said disc is supported for rotation in a housing and said housing is provided with built-in spray nozzles to permit cleaning-in-place of said disc.

* * * * *